US012788043B2

(12) United States Patent
Pan et al.

(10) Patent No.: US 12,788,043 B2
(45) Date of Patent: Nov. 10, 2026

(54) FOOD ADDITIVE FOR DISPERSING *GANODERMA LUCIDUM* POWDER AND METHOD FOR RAPIDLY DISPERSING *GANODERMA LUCIDUM* POWDER

(71) Applicant: INNOVATION CENTER OF YANGTZE RIVER DELTA, ZJU, Jiaxing (CN)

(72) Inventors: Haibo Pan, Jiaxing (CN); Suqing Lan, Jiaxing (CN); Shiguo Chen, Jiaxing (CN); Guanchen Liu, Jiaxing (CN); Donghong Liu, Jiaxing (CN); Qihe Chen, Jiaxing (CN); Tian Ding, Jiaxing (CN); Xingqian Ye, Jiaxing (CN)

(73) Assignee: INNOVATION CENTER OF YANGTZE RIVER DELTA, ZJU, Jiaxing (CN)

( * ) Notice: Subject to any disclaimer, the term of this patent is extended or adjusted under 35 U.S.C. 154(b) by 227 days.

(21) Appl. No.: 18/738,540

(22) Filed: Jun. 10, 2024

(65) Prior Publication Data

US 2024/0415159 A1 Dec. 19, 2024

(30) Foreign Application Priority Data

Jun. 19, 2023 (CN) ......................... 202310727883.5

(51) Int. Cl.
*A23L 31/00* (2016.01)
*A23L 2/38* (2021.01)

(52) U.S. Cl.
CPC ................. *A23L 31/00* (2016.08); *A23L 2/38* (2013.01)

(58) Field of Classification Search
None
See application file for complete search history.

(56) References Cited

U.S. PATENT DOCUMENTS 11,872,252 B2 * 1/2024 Hsia ......................... A61N 5/10

FOREIGN PATENT DOCUMENTS

CN 103564584 * 2/2014

OTHER PUBLICATIONS

Subedi et al. Advances in Pharmacological and Pharmaceutical Science. Oct. 2021. vol. 2021, article ID 4888979, pp. 1-7/.*
US Pharmacopeial Convention. Mar. 1, 2015, pp. 1-4).*

* cited by examiner

*Primary Examiner* — Vera Afremova
(74) *Attorney, Agent, or Firm* — Renner Kenner Greive Bobak Taylor & Weber Co., LPA

(57) ABSTRACT

Provided are a food additive for dispersing a *Ganoderma lucidum* powder and a method for rapidly dispersing a *Ganoderma lucidum* powder. The food additive for dispersing a *Ganoderma lucidum* powder includes a plant polyphenol and a metal-derived food additive in a mass ratio of (50-2,500):(0.1-0.2). The method for rapidly dispersing a *Ganoderma lucidum* powder with the food additive includes: mixing an aqueous solution of the plant polyphenol with the *Ganoderma lucidum* powder to obtain a *Ganoderma lucidum*/polyphenol mixed solution; and thoroughly mixing an aqueous solution of the metal-derived food additive with the *Ganoderma lucidum*/polyphenol mixed solution. The non-covalent binding of the plant polyphenol to *Ganoderma lucidum* polysaccharides can promote the adsorption of the plant polyphenol on a surface of *Ganoderma lucidum* powder particles to hinder the direct contact among the polysaccharides on the surface of *Ganoderma lucidum* powder particles, thereby improving the dispersion of the *Ganoderma lucidum* powder particles.

5 Claims, No Drawings

FOOD ADDITIVE FOR DISPERSING *GANODERMA LUCIDUM* POWDER AND METHOD FOR RAPIDLY DISPERSING *GANODERMA LUCIDUM* POWDER

CROSS-REFERENCE TO RELATED APPLICATION

This patent application claims the benefit and priority of Chinese Patent Application No. 2023107278835 filed with the China National Intellectual Property Administration on Jun. 19, 2023, the disclosure of which is incorporated by reference herein in its entirety as part of the present application.

TECHNICAL FIELD

The present disclosure belongs to the technical field of food additives and specifically relates to a food additive for dispersing a *Ganoderma lucidum* powder and a method for rapidly dispersing a *Ganoderma lucidum* powder.

BACKGROUND

*Ganoderma lucidum* is a traditional Chinese medicine in China and is a medicinal fungus of the genus *Ganoderma* of the family Polyporaceae. *Ganoderma lucidum* is widely distributed in temperate and subtropical regions of China. A large number of studies have shown that *Ganoderma lucidum* has a variety of functions such as improving the metabolism of glycolipids, inhibiting the proliferation and differentiation of tumor cells, enhancing the body's immune function, and eliminating oxygen free radicals and is widely used in fields such as functional foods, cosmetics, and pharmaceuticals. More than 150 functional components such as polysaccharides, volatile oils, triterpenoids, alkaloids, proteins, polypeptides, and trace elements have been isolated and identified from *Ganoderma lucidum.*

Common *Ganoderma lucidum* can include fruiting bodies and spore powders. The spore powders include more active substances than the fruiting bodies but have a low yield and a high price. However, the fruiting bodies have a high yield and can be prepared into *Ganoderma lucidum* products through traditional production procedures such as crushing, slicing, squeezing, and boiling. A fruiting body can be subjected to extraction with hot water to obtain an extract solution rich in polysaccharides and triterpenoids, and the extract solution is flavored and compounded to produce a *Ganoderma lucidum* oral liquid. The *Ganoderma lucidum* oral liquid is the most important fruiting body product on the market. However, the extraction with hot water has a low efficiency and leads to a large residue of active ingredients. In addition, dextran, a main component in a residue of the extraction, has been proven to have a variety of physiological effects such as immune regulation, lipid reduction, and sugar reduction, which results in a waste of resources.

*Ganoderma lucidum* fruiting bodies can be prepared into *Ganoderma lucidum* powders through ultra-fine crushing. The *Ganoderma lucidum* powders can be used in solid systems such as candies and jellies but can hardly be used in liquid systems due to poor reconstituablity. The poor reconstituablity refers to the fact that, when dissolved in an aqueous system such as water and milk, a *Ganoderma lucidum* powder is not easily dispersed due to the interaction of *Ganoderma lucidum* polysaccharides and is prone to agglomeration. How to solve the technical problem of poor reconstituablity of *Ganoderma lucidum* powders has become a key to the extensive use of *Ganoderma lucidum* powders in liquid systems such as milk and beverages.

SUMMARY

In view of this, an objective of the present disclosure is to provide a food additive for dispersing a *Ganoderma lucidum* powder. When the food additive is adopted, a plant polyphenol binds to and adsorbs polysaccharides on the surface of *Ganoderma lucidum* powder particles and an amount of the polyphenol adsorbed on the surface is controlled through metal ion chelation to block the interaction of the polysaccharides on the surface of the *Ganoderma lucidum* powder particles at a molecular level, thereby solving the problem of poor reconstituablity of a *Ganoderma lucidum* powder caused by the interaction of polysaccharides.

The present disclosure provides a food additive for dispersing a *Ganoderma lucidum* powder, including a plant polyphenol and a metal-derived food additive, where a mass ratio of the plant polyphenol to the metal-derived food additive is (50-2,500):(0.1-0.2).

Preferably, the mass ratio of the plant polyphenol to the metal-derived food additive is (100-500):0.1.

Preferably, the plant polyphenol includes at least one selected from the group consisting of catechins, anthocyanins, proanthocyanidins, tea polyphenols, and apple polyphenols.

Preferably, the metal-derived food additive includes at least one selected from the group consisting of iron chloride, calcium gluconate, zinc gluconate, copper gluconate, and magnesium chloride.

The present disclosure provides the use of the food additive described above in dispersion of a *Ganoderma lucidum* powder.

Preferably, a final concentration of the *Ganoderma lucidum* powder is 50 mg/mL to 100 mg/mL.

Preferably, the *Ganoderma lucidum* powder is produced through ultra-fine crushing of a *Ganoderma lucidum* fruiting body; and particles of the *Ganoderma lucidum* powder are cylindrical and have a length of 20 μm to 100 μm and a diameter of 1.2 μm to 5 μm.

The present disclosure provides a method for rapidly dispersing a *Ganoderma lucidum* powder with the food additive, including the following steps:

mixing an aqueous solution of the plant polyphenol with the *Ganoderma lucidum* powder to obtain a *Ganoderma lucidum*/polyphenol mixed solution; and thoroughly mixing an aqueous solution of the metal-derived food additive with the *Ganoderma lucidum*/polyphenol mixed solution.

Preferably, a concentration of the aqueous solution of the plant polyphenol is 10 mg/mL to 50 mg/mL;

a concentration of the aqueous solution of the metal-derived food additive is 0.2 mg/mL to 0.4 mg/mL; and a volume ratio of the aqueous solution of the metal-derived food additive to the *Ganoderma lucidum*/polyphenol mixed solution is 1:(10-100).

The present disclosure provides a *Ganoderma lucidum* drink, including the food additive described above, a *Ganoderma lucidum* powder, and a solution medium, where a mass ratio of the food additive to the *Ganoderma lucidum* powder is 1:(1.6-4.3); and a mass fraction of the *Ganoderma lucidum* powder in the solution medium is 2.0% to 3.0%.

The present disclosure provides a food additive for dispersing a *Ganoderma lucidum* powder, including a plant polyphenol and a metal-derived food additive, where a mass ratio of the plant polyphenol to the metal-derived food additive is (50-2,500):(0.1-0.2). In the present disclosure, the plant polyphenol can bind to *Ganoderma lucidum* polysaccharides in a non-covalent form and can also undergo chelation with metal ions to block the interaction among polysaccharides on the surface of the *Ganoderma lucidum* powder particles, such that the *Ganoderma lucidum* powder can be rapidly dispersed, which improves the extraction efficiency and solubility of *Ganoderma lucidum* polysaccharides.

The present disclosure also provides a method for rapidly dispersing a *Ganoderma lucidum* powder with the food additive, including the following steps: mixing an aqueous solution of the plant polyphenol with the *Ganoderma lucidum* powder to obtain a *Ganoderma lucidum*/polyphenol mixed solution; and thoroughly mixing an aqueous solution of the metal-derived food additive with the *Ganoderma lucidum*/polyphenol mixed solution. The food additive can block the interaction among polysaccharides on the surface of the *Ganoderma lucidum* powder particles at a molecular level to solve the problem of poor reconstituablity of the *Ganoderma lucidum* powder caused by the interaction among the polysaccharides. In addition, because the addition of the plant polyphenol can provide a unique flavor, make up for the flavor defects of a *Ganoderma lucidum* powder, inhibit the release of *Ganoderma lucidum* acids, and reduce the bitterness of the *Ganoderma lucidum* powder, a *Ganoderma lucidum* powder product prepared accordingly has characteristics such as a prominent flavor and a wide adaptation range. The *Ganoderma lucidum* powder product prepared by the method not only can be added as an instant product to drinks such as milk and beverages but also can be used as a raw material for subsequent production of various *Ganoderma lucidum* products. In addition, the raw materials involved in the preparation method of the present disclosure are safe and have remarkable health care effects. The tea polyphenol in the product can promote the release of active substances in *Ganoderma lucidum* fruiting body, inhibit the growth of bacteria, maintain the activity of *Ganoderma lucidum*, and cooperate with *Ganoderma lucidum* to play anti-cancer, antioxidant, hypoglycemic, and hypolipidemic roles. The metal ion solution added meets the FDA standards and can supplement the daily elements required by the human body. Moreover, the preparation method of the present disclosure is simple and has a low cost, and a product of the preparation method is easy to carry, which is conducive to the subsequent preparation of *Ganoderma lucidum*-related products.

DETAILED DESCRIPTION OF THE EMBODIMENTS

The present disclosure provides a food additive for dispersing a *Ganoderma lucidum* powder, including a plant polyphenol and a metal-derived food additive, where a mass ratio of the plant polyphenol to the metal-derived food additive is (50-2,500):(0.1-0.2).

In the present disclosure, the mass ratio of the plant polyphenol to the metal-derived food additive is preferably (100-500):0.1. The plant polyphenol preferably includes at least one selected from the group consisting of catechins, anthocyanins, proanthocyanidins, tea polyphenols, and apple polyphenols, and more preferably is a pomegranate seed proanthocyanidin, epigallocatechin gallate (EGCG), or a green tea polyphenol. The metal-derived food additive preferably includes at least one selected from the group consisting of iron chloride, calcium gluconate, zinc gluconate, copper gluconate, and magnesium chloride.

The present disclosure provides the use of the food additive described above in the dispersion of a *Ganoderma lucidum* powder.

In the present disclosure, a final concentration of the *Ganoderma lucidum* powder is preferably 50 mg/mL to 100 mg/mL and more preferably 75 mg/mL. The *Ganoderma lucidum* powder is preferably produced through ultra-fine crushing of a *Ganoderma lucidum* fruiting body. Particles of the *Ganoderma lucidum* powder are cylindrical and have a length of 20 μm to 100 μm and a diameter of 1.2 μm to 5 μm.

The present disclosure provides a method for rapidly dispersing a *Ganoderma lucidum* powder with the food additive, including the following steps:

an aqueous solution of the plant polyphenol is mixed with the *Ganoderma lucidum* powder to obtain a *Ganoderma lucidum*/polyphenol mixed solution; and an aqueous solution of the metal-derived food additive is thoroughly mixed with the *Ganoderma lucidum*/polyphenol mixed solution.

In the present disclosure, a concentration of the aqueous solution of the plant polyphenol is preferably 10 mg/mL to 50 mg/mL, more preferably 15 mg/mL to 45 mg/mL, further more preferably 20 mg/mL to 40 mg/mL, and most preferably 30 mg/mL; and a concentration of the aqueous solution of the metal-derived food additive is preferably 0.2 mg/mL to 0.4 mg/mL and more preferably 0.2 mg/mL to 0.25 mg/mL. A volume ratio of the aqueous solution of the metal-derived food additive to the *Ganoderma lucidum*/polyphenol mixed solution is preferably 1:(10-100) and more preferably 1:50.

In the present disclosure, after the thorough mixing, it preferably further includes sterilization, homogenization, and water removal. The sterilization preferably includes pasteurization, and the pasteurization is conducted at preferably 65° C. for preferably 15 min to 20 min. A method for the water removal is preferably spray-drying, and the spray-drying is conducted with a temperature of preferably 125° C., an outlet air temperature of preferably 85° C., a pressure of preferably 80 MPa, and an atomizer rotational speed of preferably 22,000 r/min.

The present disclosure provides a *Ganoderma lucidum* drink, including the food additive described above, a *Ganoderma lucidum* powder, and a solution medium, where a mass ratio of the food additive to the *Ganoderma lucidum* powder is 1:(1.6-4.3); and a mass fraction of the *Ganoderma lucidum* powder in the solution medium is 2.0% to 3.0%.

In the present disclosure, the mass ratio of the food additive to the *Ganoderma lucidum* powder is preferably 1:1.67, 1:2.4, 1:2.6, or 1:4.23; and the mass fraction of the *Ganoderma lucidum* powder in the solution medium is preferably 2.2% to 2.8% and more preferably 2.4% to 2.6%.

In the present disclosure, a preparation method for the *Ganoderma lucidum* drink is preferably as follows: a prepared rapidly-dispersed *Ganoderma lucidum* powder is mixed with the solution medium to obtain the *Ganoderma lucidum* drink in which the *Ganoderma lucidum* powder is dissolved rapidly with excellent dispersion. A mass percentage of the rapidly-dispersed *Ganoderma lucidum* powder in the solution medium is preferably 2.5%. The *Ganoderma lucidum* drink includes water, an orange juice, milk, or the like.

The food additive for dispersing a *Ganoderma lucidum* powder and the method for rapidly dispersing a *Ganoderma lucidum* powder provided in the present disclosure are described in detail below with reference to examples, but these examples may not be understood as limiting the protection scope of the present disclosure.

Example 1

A preparation method for rapidly-dispersed *Ganoderma lucidum* powder was provided, including the following steps:

1) 1.17 g of 85% pomegranate seed proanthocyanidin was added to and dissolved in 50 mL of purified water to obtain a first intermediate solution, and the first intermediate solution was stirred at room temperature for 10 seconds to obtain a pomegranate seed proanthocyanidin solution.
2) 5 g of an ultrafine *Ganoderma lucidum* fruiting body powder with a diameter of 1.2 μm to 5 μm was added to the pomegranate seed proanthocyanidin solution prepared in step 1 to obtain a second intermediate solution, and the second intermediate solution was stirred for 20 min to obtain a homogeneous *Ganoderma lucidum*/pomegranate seed proanthocyanidin mixed solution.
3) 10 mg of food-grade calcium gluconate was added to 50 mL of purified water to obtain a third intermediate solution, and the third intermediate solution was thoroughly stirred to obtain a metal ion solution.
4) 5 mL of the metal ion solution prepared in step 3) was taken and added to 50 mL of the *Ganoderma lucidum*/pomegranate seed proanthocyanidin mixed solution obtained in the step 2) to obtain a metal ion/*Ganoderma lucidum*/pomegranate seed proanthocyanidin mixed solution.
5) The metal ion/*Ganoderma lucidum*/pomegranate seed proanthocyanidin mixed solution obtained in step 4) was thoroughly stirred and pasteurized at 65° C. for 15 min to 20 min to obtain a sterilized material.
6) The sterilized material was homogenized, preheated, and then spray-dried with an inlet air temperature of 125° C., an outlet air temperature of 85° C., a pressure of 80 MPa, and an atomizer rotational speed of 22,000 r/min to obtain a rapidly-dispersed *Ganoderma lucidum* powder.

A preparation method of a *Ganoderma lucidum* milk drink was as follows: 5 g of the rapidly-dispersed *Ganoderma lucidum* powder was taken and added to 200 mL of milk to obtain an immediate drink, and the immediate drink was slightly stirred to obtain the *Ganoderma lucidum* milk drink in which the *Ganoderma lucidum* powder was dissolved rapidly and dispersed evenly.

Example 2

A preparation method for and use of a rapidly-dispersed *Ganoderma lucidum* powder were provided, including the following steps sequentially:

1) 4 g of EGCG was added to and dissolved in 100 mL of purified water to obtain a first immediate solution, and the first immediate solution was stirred at room temperature for 10 seconds to obtain an EGCG aqueous solution.
2) 7.5 g of ultrafine *Ganoderma lucidum* fruiting body powder was added to the EGCG aqueous solution to obtain a second immediate solution, and the second immediate solution was stirred for 20 min to obtain a homogeneous *Ganoderma lucidum*/EGCG mixed solution.
3) 10 mg of food-grade iron chloride was added to 50 mL of purified water to obtain a third intermediate solution, and the third intermediate solution was stirred to make the food-grade iron chloride fully dissolved and evenly dispersed to obtain a metal ion solution.
4) 10 mL of the metal ion solution prepared in step 3) was taken and added to 100 mL of the *Ganoderma lucidum*/EGCG mixed solution obtained in step 2) to obtain a metal ion/*Ganoderma lucidum*/EGCG mixed solution.
5) The metal ion/*Ganoderma lucidum*/EGCG mixed solution obtained in step 4) was thoroughly stirred and pasteurized at 65° C. for 15 min to 20 min to obtain a sterilized material.
6) The sterilized material was homogenized, preheated, and then spray-dried with an inlet air temperature of 125° C., an outlet air temperature of 85° C., a pressure of 80 MPa, and an atomizer rotational speed of 22,000 r/min to obtain a rapidly-dispersed *Ganoderma lucidum* powder.
7) 5 g of rapidly-dispersed *Ganoderma lucidum* powder was taken and added to 200 mL of a milk drink to obtain an immediate drink, and the immediate drink was slightly stirred to obtain a *Ganoderma lucidum* milk drink in which the *Ganoderma lucidum* powder was dissolved rapidly and dispersed evenly.

Example 3

A preparation method for and use of a rapidly-dispersed *Ganoderma lucidum* powder were provided, including the following steps sequentially:

1) 3.12 g of 80% green tea polyphenol was added to and dissolved in 50 mL of purified water to obtain a first immediate solution, and the first immediate solution was stirred at room temperature for 10 s to obtain a green tea polyphenol solution.
2) 5 g of ultrafine *Ganoderma lucidum* fruiting body powder was added to the green tea polyphenol solution to obtain a second immediate solution, and the second immediate solution was stirred for 20 min to obtain a homogeneous *Ganoderma lucidum*/green tea polyphenol mixed solution.
3) 10 mg of food-grade zinc gluconate was added to and dissolved in 50 mL of purified water to obtain a metal ion solution.
4) 5 mL of the metal ion solution prepared in step 3) was taken and added to 50 mL of the *Ganoderma lucidum*/green tea polyphenol mixed solution obtained in step 2) to obtain a metal ion/*Ganoderma lucidum*/green tea polyphenol mixed solution.
5) The metal ion/*Ganoderma lucidum*/green tea polyphenol mixed solution obtained in step 4) was thoroughly stirred and pasteurized at 65° C. for 15 min to 20 min to obtain a sterilized material.
6) The sterilized material was homogenized, preheated, and then spray-dried with an inlet air temperature of 125° C., an outlet air temperature of 85° C., a pressure of 80 MPa, and an atomizer rotational speed of 22,000 r/min to obtain a rapidly-dispersed *Ganoderma lucidum* powder.

A preparation method for *Ganoderma lucidum* orange juice was as follows: 5 g of the rapidly-dispersed *Ganoderma lucidum* powder was taken and added to 200 mL of orange juice to obtain an immediate drink, and the immediate drink was slightly stirred to obtain the *Ganoderma*

*lucidum* orange juice in which the *Ganoderma lucidum* powder was dissolved rapidly and dispersed evenly.

Example 4

A preparation method for and use of the rapidly-dispersed *Ganoderma lucidum* powder was provided, including the following steps sequentially:

1) 5 g of 60% apple polyphenol product was added to 100 mL of purified water to obtain a first immediate solution, and the first immediate solution was stirred at room temperature for 10 seconds to obtain an apple polyphenol solution.
2) 7.5 g of ultrafine *Ganoderma lucidum* fruiting body powder was added to the apple polyphenol solution to obtain a second immediate solution, and the second immediate solution was stirred for 15 min to obtain a homogeneous *Ganoderma lucidum*/apple polyphenol mixed solution.
3) 12 mg of food-grade calcium gluconate was added to and dissolved in 50 mL of purified water to obtain a metal ion solution.
4) 5 mL of metal ion solution prepared in step 3) was taken and added to 50 mL of the *Ganoderma lucidum*/apple polyphenol mixed solution obtained in step 2) to obtain a metal ion/*Ganoderma lucidum*/apple polyphenol mixed solution.
5) The metal ion/*Ganoderma lucidum*/apple polyphenol mixed solution obtained in step 4) was thoroughly stirred and pasteurized at 65° C. for 15 min to 20 min to obtain a sterilized material.
6) The sterilized material was homogenized, preheated, and then spray-dried with an inlet air temperature of 125° C., an outlet air temperature of 85° C., a pressure of 80 MPa, and an atomizer rotational speed of 22,000 r/min to obtain a rapidly-dispersed *Ganoderma lucidum* powder.

A preparation method for *Ganoderma lucidum* tea water was as follows: 2.5 g of the rapidly-dispersed *Ganoderma lucidum* powder was taken and added to 100 mL of purified water to obtain an immediate drink, and the immediate drink was slightly stirred to obtain the *Ganoderma lucidum* tea water with an excellent flavor in which the *Ganoderma lucidum* powder was dissolved rapidly and dispersed evenly.

Example 5

The drinks prepared in Examples 1 to 4 each were tested by a Malvern particle size potential instrument for particle size and PDI values at 5 min and 30 min after dissolution, and a negative control (an untreated *Ganoderma lucidum* aqueous solution), a *Ganoderma lucidum* powder dispersion with only a plant polyphenol added, and a *Ganoderma lucidum* powder dispersion with only a metal ion added were set. The untreated *Ganoderma lucidum* aqueous solution was obtained by directly adding an ultrafine *Ganoderma lucidum* fruiting body powder to purified water. A technical solution of the group with only a plant polyphenol added was the same as the solution in Example 1, except that the metal ion was not added. A technical solution of the group with only a metal ion added was the same as the solution in Example 1, except that the plant polyphenol was not added. A specific determination method was as described above.

Results are shown in Table 1. The results show that PDI values of both the untreated *Ganoderma lucidum* solution and the *Ganoderma lucidum* solution with only a metal ion exceed 0.7, indicating that the solutions are unstable and inhomogeneous, that is, the solubility is poor. The addition of a polyphenol can improve a dissolution effect, but due to the lack of a metal ion to control an amount of the adsorbed polyphenol through a chelation coordination, a particle size of *Ganoderma lucidum* is large. The four treatment groups in which both a polyphenol and a metal ion are added all have a smaller particle size and a smaller PDI than the untreated group, indicating that the corresponding solutions have excellent dispersion and are homogeneous.

TABLE 1

Particle size and PDI results of drinks in different treatment groups

| Treatment group | Average particle size/μm (5 min) | PDI (5 min) | Average particle size/μm (30 min) | PDI (30 min) |
|---|---|---|---|---|
| Untreated *Ganoderma lucidum* aqueous solution | 7.18 | 0.709 | 7.62 | 0.715 |
| Polyphenol only | 6.12 | 0.511 | 6.18 | 0.589 |
| Metal ion only | 7.24 | 0.726 | 7.59 | 0.822 |
| *Ganoderma lucidum* milk in Example 1 | 3.61 | 0.105 | 3.52 | 0.259 |
| *Ganoderma lucidum* milk in Example 2 | 3.66 | 0.208 | 3.81 | 0.233 |
| *Ganoderma lucidum* orange juice in Example 3 | 3.22 | 0.247 | 3.39 | 0.275 |
| *Ganoderma lucidum* tea water in Example 4 | 2.11 | 0.243 | 2.12 | 0.257 |

The above are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A *Ganoderma lucidum* composition, consisting of a *Ganoderma lucidum* powder and a food additive, wherein the food additive consists of a plant polyphenol and a metal-derived food additive;

wherein a mass ratio of the plant polyphenol to the metal-derived food additive is (50-2,500):(0.1-0.2); and wherein the *Ganoderma lucidum* powder is produced through ultra-fine crushing of a *Ganoderma lucidum* fruiting body, and particles of the *Ganoderma lucidum* powder are cylindrical and have a length of 20 μm to 100 μm and a diameter of 1.2 μm to 5 μm.

2. The *Ganoderma lucidum* composition according to claim 1, wherein the mass ratio of the plant polyphenol to the metal-derived food additive is (100-500):0.1.

3. The *Ganoderma lucidum* composition according to claim 1, wherein the plant polyphenol comprises at least one selected from the group consisting of catechins, anthocyanins, proanthocyanidins, tea polyphenols, and apple polyphenols.

4. The *Ganoderma lucidum* composition according to claim 1, wherein the metal-derived food additive comprises at least one selected from the group consisting of iron chloride, calcium gluconate, zinc gluconate, copper gluconate, and magnesium chloride.

5. The *Ganoderma lucidum* composition according to claim 1, wherein a mass percentage of the *Ganoderma lucidum* powder in the *Ganoderma lucidum* composition is 61.5%-81.1%.

* * * * *